(12) United States Patent
Matthiesen et al.

(10) Patent No.: US 9,715,382 B2
(45) Date of Patent: Jul. 25, 2017

(54) CLASS AND NAMESPACE DISCOVERY IN PROTOTYPE BASED LANGUAGE

(71) Applicant: Microsoft Corporation, Redmond, WA (US)

(72) Inventors: Jordan L Matthiesen, Sammamish, WA (US); Mohamed Hegazy, Sammamish, WA (US); Charles P Jazdzewski, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 108 days.

(21) Appl. No.: 13/926,224

(22) Filed: Jun. 25, 2013

(65) Prior Publication Data

US 2014/0380276 A1    Dec. 25, 2014

(51) Int. Cl.
*G06F 9/44*    (2006.01)

(52) U.S. Cl.
CPC ..................................... *G06F 8/75* (2013.01)

(58) Field of Classification Search
CPC ........................................................ G06F 8/75
USPC ........................................................ 717/123
See application file for complete search history.

(56) References Cited

U.S. PATENT DOCUMENTS

| | | | | |
|---|---|---|---|---|
| 6,066,181 | A * | 5/2000 | DeMaster | 717/148 |
| 7,240,338 | B1 * | 7/2007 | Bell et al. | 717/137 |
| 7,509,584 | B2 | 3/2009 | Moser | |
| 7,669,178 | B2 * | 2/2010 | Chiles et al. | 717/100 |
| 7,676,786 | B2 | 3/2010 | Shenfield et al. | |
| 7,971,194 | B1 * | 6/2011 | Gilboa | 717/136 |
| 7,992,130 | B2 * | 8/2011 | Bozza et al. | 717/116 |
| 8,458,682 | B2 * | 6/2013 | Mercer et al. | 717/155 |
| 8,752,035 | B2 * | 6/2014 | Fanning | G06F 8/49 717/141 |
| 8,789,018 | B2 * | 7/2014 | Fanning | G06F 8/43 717/123 |
| 2005/0081193 | A1 * | 4/2005 | Chiles et al. | 717/136 |
| 2005/0166193 | A1 * | 7/2005 | Smith et al. | 717/143 |
| 2005/0251382 | A1 * | 11/2005 | Chang et al. | 704/9 |
| 2007/0136250 | A1 * | 6/2007 | Lindblad et al. | 707/3 |
| 2008/0141219 | A1 | 6/2008 | Chinnici | |
| 2008/0307389 | A1 * | 12/2008 | Marchant | 717/115 |
| 2011/0138361 | A1 | 6/2011 | McEntee et al. | |
| 2011/0173597 | A1 * | 7/2011 | Cascaval et al. | 717/148 |
| 2012/0084750 | A1 | 4/2012 | Hardy et al. | |

(Continued)

OTHER PUBLICATIONS

Chugh et al., "Staged Information Flow for JavaScript", Retrieved date <<http://cseweb.ucsd.edu/~lerner/papers/pldi09-sif.pdf>>, In Proceedings of the 31st ACM Conference on Programming Language Design and Implementation, Jun. 15, 2009, pp. 13.

(Continued)

*Primary Examiner* — John Chavis
(74) *Attorney, Agent, or Firm* — David W. Grillo

(57) ABSTRACT

Structure of a prototype-based programming language program is determined based on results of program execution. The structure determined can be implied by a program rather than explicitly declared. For example, classes and namespaces of a prototype-based program can be detected or inferred by identifying patterns that indicate the presence of a class or namespace. Furthermore, members of classes and namespaces can also be determined.

20 Claims, 7 Drawing Sheets

(56) References Cited

U.S. PATENT DOCUMENTS

2012/0311533 A1* 12/2012 Fanning .................... G06F 8/33
717/111
2012/0311535 A1 12/2012 Fanning et al.
2014/0181819 A1* 6/2014 Mickens ................ G06F 21/53
718/100

OTHER PUBLICATIONS

Jazdzewski et al., "State Capture After Execution in Dependent Sequences", U.S. Appl. No. 13/329,130, filed Dec. 16, 2011, pp. 51.
Jazdewski et al., "Available Symbol Set Generation Using Untyped Variable", U.S. Appl. No. 13/329,136, filed Dec. 16, 2011, pp. 48.
Jazdzewski et al., "Abstract Syntax Tree Transformation", U.S. Appl. No. 13/329,138, filed Dec. 16, 2011, pp. 53.
Jazdzewski et al., "Language Service Provider Management Using Application Context", U.S. Appl. No. 13/329,140, filed Dec. 16, 2011, pp. 42.

* cited by examiner

CLASS AND NAMESPACE DISCOVERY IN PROTOTYPE BASED LANGUAGE

BACKGROUND

In an object-oriented programming paradigm, an object represents some real-world entity as a data structure that has properties including an identity, state, and behavior. The identity is the property of an object that distinguishes an object from other objects. State is data that is stored in an object, and behavior is a set of actions that can be performed by an object. Furthermore, relationships between objects can be established by way of inheritance. In other words, an object can inherit state and behavior from another object. There are two distinct styles of object-oriented programming, namely class-based or prototype-based.

Class-based object-oriented languages include classes and instances. A class defines properties that characterize a particular set of objects. Stated differently, a class provides a set of instructions (a.k.a. constructors) to build a particular type of object. An instance is an instantiation of a class, or, in other words, an object constructed from a specific class. Further, inheritance is specified by way of a class. For example, a class can be specified as a subclass of an already existing class. In this case, the subclass inherits all the properties of the superclass and can optionally add new properties or override inherited properties.

In prototype-based object-oriented languages, there are no explicit classes but rather only objects. While an object can be created from nothing, it is more prevalent for objects to be created by cloning existing objects referred to as prototype objects or simply prototypes. Here, the prototype acts as a template to construct a new object with the same object properties. More specifically, objects can be constructed from a function defining a prototype by calling the function in a constructor context, for example utilizing the "new" keyword." Objects can inherit from other objects utilizing a prototype property of an object to reference another object. In the context of cloning, for instance, the prototype property of the newly created object can be set to reference the prototype object.

SUMMARY

The following presents a simplified summary in order to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure pertains to discovering structure implied by a program specified in a prototype-based programming language based on results produced from executing the program. In one instance, classes and namespaces implied by a prototype-based program (rather than being explicitly declared) can be detected or inferred based on patterns indicative of classes and namespaces. Furthermore, member classes and namespaces can also be determined. Together any identified classes, namespaces, and members can be considered a dynamic structure that can be output, for example to a program editor or development environment to facilitate program navigation. Furthermore, a number of optimizations can be employed to at least expedite processing and thereby improve performance.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Figure 1:
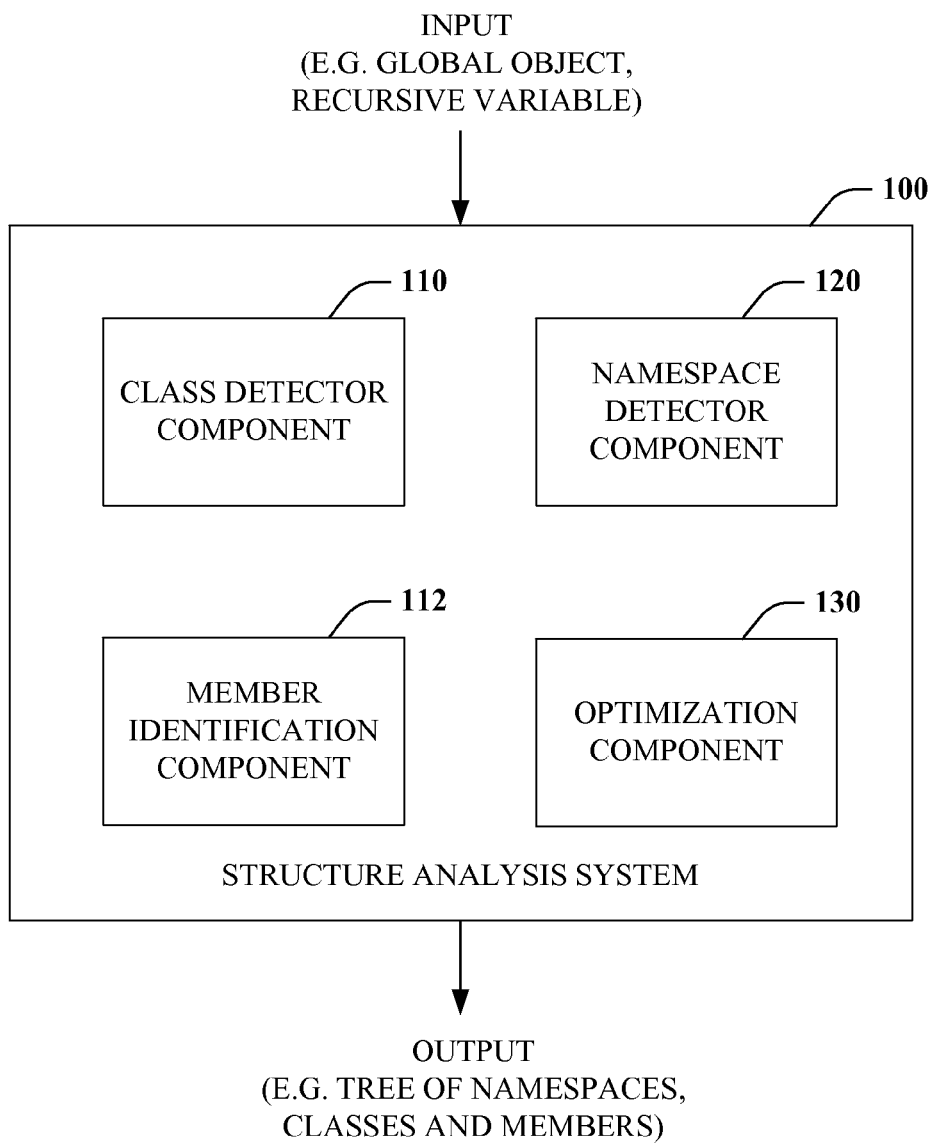
FIG. 1 is a block diagram of a structure analysis system.

Source code navigation is a desirable feature for source code or program editing as it allow users to determine what is contained within a source code file and navigate to a particular construct of interest. An editor or development environment can provide such functionality. For instance, information about the content of a source code file can be provided by way of a pair of dropdown lists, wherein one list includes a list of containers, which are typically classes and namespaces, and the other list can contain members of those classes and namespaces. This is quite useful in navigating a file, especially a large file. For example, if a user wants to find a member of a class, the user can first locate and select a class in the first dropdown list and then find the member of that class in the second list.

Conventionally, navigation is driven by language constructs such as explicit class and namespace declarations in class-based programming languages. For prototype-based programming languages, however, there is no declaration of classes and namespaces. Accordingly, development environments either do not provide such navigation or provide navigation using a function's name itself, which might not correspond to what a user had envisioned as a class. Without such navigation features, navigating a large file or large codebase can be difficult.

Previous solutions use static code pattern matching to display some functions as classes. However, this technique does not detect classes that are dynamically constructed such as by using a helper function, which is becoming increasingly popular as libraries with support for class-based object oriented development are adopted for use in prototype-based programming languages. Each library has a unique, or mostly unique, calling pattern to construct a class, requiring pattern matching to be adapted or customized for each library. Further, some development teams will invent a custom library just for their use with its own convention, or create high-level wrappers of an existing library, both further complicating detection of classes from patterns. As a result, many classes fail to be recognized as classes.

Details below generally pertain to discovering structure implied by a program specified in a prototype-based programming language based on results of program execution. More specifically, classes and namespaces implied but not explicitly declared by a prototype-based programming language can be determined or inferred by identifying patterns that indicated the presence of a class or namespace from execution results. In other words, a code file whose structure is to be determined is executed and the results of execution are examined to determine what classes and namespaces are created or augmented by the code. Regardless of how a function was created (e.g., inline or through a helper function), the runtime result will be the same, and that is what is inspected to determine code structure. Furthermore, members of classes and namespaces can also be identified. Together any identified classes, namespaces, and members form a dynamic structure that can be output, for example to a program editor or development environment for use with respect to program navigation. A number of optimizations can be employed to at least expedite processing and thereby improving performance.

Various aspects of the subject disclosure are now described in more detail with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

Referring initially to FIG. 1, a structure analysis system 100 is illustrated. The structure analysis system 100 receives input corresponding to a program, or a portion of a program, and outputs structure implied by the program but not explicitly declared. More specifically, the program can be written in a dynamic, prototype-based, object-oriented programming language such as, but not limited to, ECMAScript®, JavaScript®, Jscript®, or Self™, and the structure can correspond to classes, namespaces, and members thereof. Prototype-based programming languages have notions of classes and namespaces but do not include syntax for declaring classes and namespaces as is provided in class-based programming languages. The structure analysis system 100 can discover classes and namespaces in prototype-based languages without explicit declarations based on patterns that indicate the presence of a class or namespace. Moreover, the structure analysis system can operate on results of program execution as opposed to or in addition to static analysis of program syntax.

The structure analysis system 100 includes class detector component 110, which is configured to detect or infer classes in a program specified in a dynamic prototype-based language, for instance. Further, the class detector component 110 can seek to detect patterns in a program or one or more portions thereof that indicate the presence of a class. A distinguishing feature of a class is that it is used to construct new instances of a particular shape, or in other words, the new instances include the same members (e.g., data member (a.k.a., fields), methods . . . ). For example, if you have a class "Person," when instances of "Person" are created, the instances would include the same fields (a.k.a., instance variables) such as "name" and "address," among other things. Stated differently, a class is an instance factory. Accordingly, if such a pattern is present, the class detector component 110 can detect the presence of a class.

More specifically, dynamic prototype-based languages, such as JavaScript, include a number of functions that can take the role of a class. The class detector component 110 can detect functions that operate as classes. Since methods specify behavior of an object, in accordance with one embodiment, a class can be identified if a function includes one or more methods (e.g., functions specified as property values) added by way of a prototype object, for instance. There are cases, nevertheless, where a class does not include any prototype methods. Consequently, in accordance with another embodiment, a class can also be identified if a function includes one or more fields or instance variables, for example set with the "this" keyword on a function.

The structure analysis system 100 also includes member identification component 112. The member identification component 112 is configured to identify any members of a class discovered by the class detector component 110. Members of a class, or, in other words, class members, include data such as fields representing variables, and methods (a.k.a. member functions), among other things that pertain to state and behavior of a class. In general, class members include any program construct created by a constructor. For example, if a function that operates as a class is called with a "new" keyword, the function executes in a constructor context and can produce constants, fields, methods, among other things, all of which are class members. Accordingly, for each class discovered by the class detector component 110, the member identification component 112 can identify one or more class members.

Namespace detector component 120 is also included in the structure analysis system 100. The namespace detector component 120 is configured to detect or infer one or more namespaces in a program or portion thereof based on one or more patterns that indicate the presence or existence of namespaces. A namespace specifies a container or grouping of entities to allow disambiguation of entities with the same name in different groups. A namespace is often embodied as a container for classes. Accordingly, in one embodiment, the namespace detector component 120 can seek to identify the presence of one or more classes. Where an object includes one or more class, the object can be labeled a namespace. In one instance, the namespace detector component 120 can call the class detector component 110 to enable a class to be identified. Namespaces can be nested. Consequently, in accordance with another embodiment, the namespace detector component 120 can identify an object as a namespace if the object includes another namespace, which includes at least one class.

The namespace detector component 120 can also be configured to identify namespace members including one or more classes or namespaces. Alternatively, the member identification component 112 can be configured to identify namespace members as well as class members.

The class detector component 110, member identification component 112, and the namespace detector component 120 can operate over results produced by execution of a program or portion thereof. In one instance, program execution can cause program global scope to be augmented to include classes and namespaces. Input to the structure analysis system 100 can be the global object, which can be traversed during analysis. Class detector component 110, member identification component 112, and namespace detector component 120 are then configured to determine what classes, members, and namespace exist in the global scope.

The structure analysis system 100 also includes an optimization component 130 that can be configured to improve system performance. In accordance with one embodiment, the optimization component 130 can take snapshots of the global scope, for example, and classify objects as changed or unchanged. Upon subsequent execution, it can be determined from the snapshot whether an object has been modified or not since previous execution. Accordingly, analysis can be confined to changes made which can subsequently be utilized to update classes, members, and namespaces previously detected. In this manner, the optimization component 130 enables incremental processing as opposed to requiring complete analysis of global scope every time.

In accordance with another embodiment, the optimization component 130 can be configured to filter out particular portions of a program to expedite processing. By way of example, some functions can have side effects that cache information within the global scope for performance reasons. This information is not part of a program specified by a user but rather a performance optimization. In this instance, such information in the global scope can be excluded from processing.

According to yet another embodiment, the optimization component 130 can be configured to prevent processing objects multiple times in the presence of loops. The global scope can be a graph such that when traversing the global scope recursively a loop might be encountered. To combat this, the optimization component 130 can mark objects that are processed such that they are not processed again recursively. Similarly, the optimization component can prevent an object from being traversed that can be reached along multiple paths. For example, consider five objects, "A," "B," "C," "D," and "E" where "A" and "D" are in the global scope and "A" points to "B," which points to "C" and "D," which points to "E," which then points to "C." "C" need only be traversed once even though there are multiple ways to reach the specific object.

In some instances, portions of programs may not be accessible through a global object or scope for analysis. This is often the result of encapsulation, which keeps information private from other parts of an application. To address this issue the structure analysis system 100 can augment a program runtime such that the encapsulated information is accessible in the global scope and subject to analysis.

Together any identified classes, namespaces, and members can be termed a dynamic structure, as the structure is determined based on dynamic information and can be modified based upon subsequent executions. In accordance with one embodiment, the dynamic structure can be a tree, outline, or like format that identifies classes, namespaces, members and relationships, which can be presented to users by way of a user interface associated with a program editor or development environment to assist users in navigating and searching through source code and project files. For instance, a class view pane can provide a view of classes and class members in a tree or outline format with dependency information. As a result, a user can quickly navigate to any classes or class members of interest. Further, the class view can present namespaces defined in a program or project along with any classes defined in a default namespace. As another example, the output can be utilized to populate a navigation bar including two boxes, namely one that lists all classes defined and another that lists members for the class. Additionally, the classes can be organized by namespace including a default namespace and any other namespaces included in a code base (e.g., collection of source code utilized to build an application).

Figure 2:
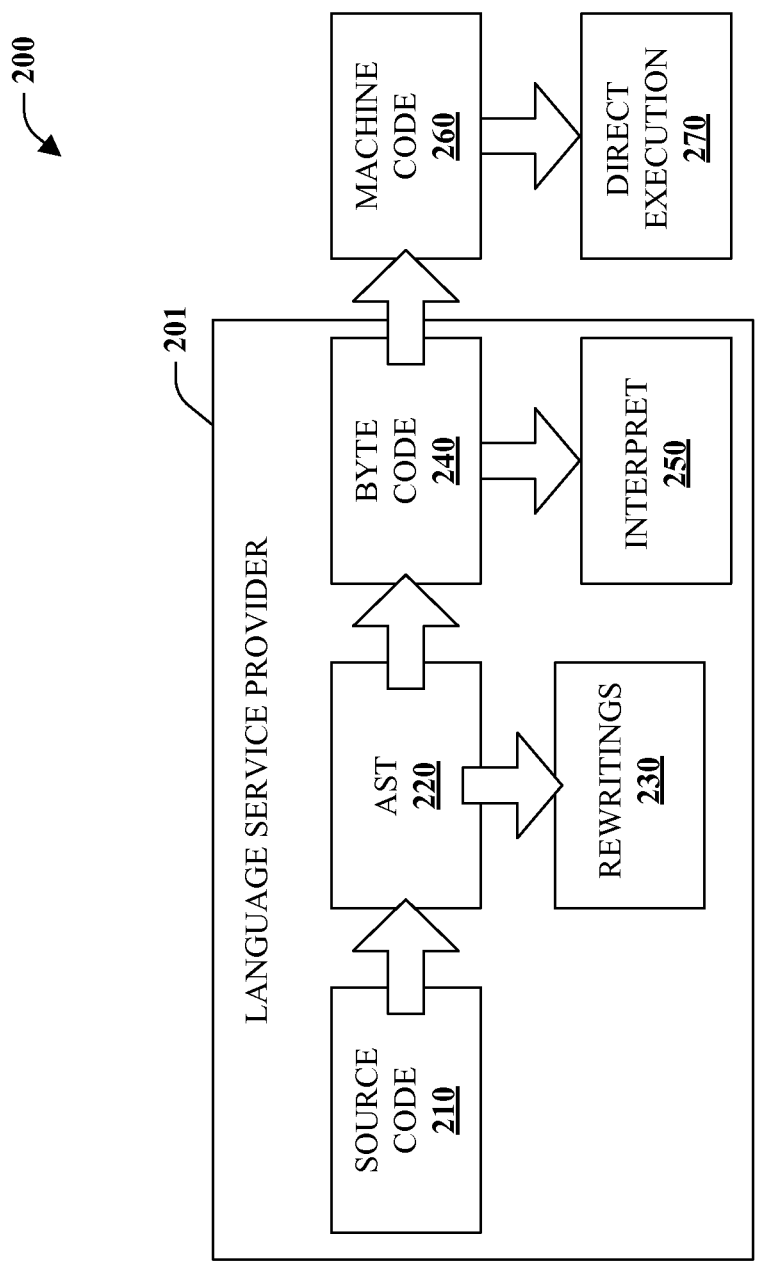
FIG. 2 is a block diagram of an environment in which the structure analysis system can be employed.

FIG. 2 depicts an environment 200 within which the structure analysis system 100 of FIG. 1 can be employed. The environment 200 includes a language service provider 201 (which can be a component as defined later herein) as well as a certain flow of actions and program representations that are handled within the language service provider 201 and outside the language service provider.

The language service provider 201 begins its analysis with source code 210 of a dynamic prototype-based language program being authored in its current authoring state, whether the authoring state represents a point in the process of authoring, or even after authoring, when the correctness of the code is under evaluation. The source code 210 may include the application context as well that gives a description of the actual runtime in which the program is anticipated to be executed. Briefly, there is more information regarding the runtime environment to allow for a more accurate approximation of the actual execution environment in which the program would be executed if deployed in its current state.

In some embodiments, the program represents just one code segment in a dynamic code sequence. In that case, the application context provides information describing the position of the dynamic language program in the sequence. Furthermore, to improve efficiency of execution, the language service provider 201 may have captured an execution state of the dynamic code sequence prior to execution of the dynamic prototype-based language program. In that way, when the program is to be re-executed, rather than execute all code segments in the dynamic code sequence prior to executing the program, the language service provider may set the execution state to be that prior captured state, and then immediately execute the program. In addition to the dependency information of the dynamic code sequence, the captured execution state may be included within the application context.

The source code 210 (along with its application context) is at least partially converted into an abstract syntax tree 220. An abstract syntax tree is a tree representation of the syntactic structure of the corresponding source code. Typically, each node in the abstract syntax tree represents a construct of the source code. For any given parent node (corresponding to a parent construct) that has children nodes (corresponding to children constructs), the children construct is a component construct within the parent construct, wherein the child construct and the parent construct have a particular relationship. Abstract syntax trees are known in the art, and use of the terms is not intended to differ from the ordinary and customary meaning of that term.

Unlike conventional abstract syntax trees, however, the abstract syntax tree 220 is subject to transformation by rewriting 230. For example, the abstract syntax tree can be transformed in a manner that permits execution in a scenario in which a current version of a program that is being authored or edited is not entirely syntactically correct. Optionally, directed execution transformations can be made with the purpose of changing the course of execution in a determined way. The abstract syntax tree, whether transformed or not, can then be converted to byte code 240 and interpreted 250 by the language service provider 201.

The byte code 240 can optionally be converted to machine code 260, and such machine code 260 provided as output from the language service provider 201. The machine code 260 may then be directly executed 270 by the environment 200 outside of the language service provider 201.

The environment 200 may be implemented by, for example, a computer or computing device as described later herein with reference to FIG. 7. For instance, a computer can have access to a computer-readable storage medium that has thereon computer-executable instructions that are structured such that, when executed by a processor in instruction cause the computer to provide all or portions of the environment 200.

As a dynamic prototype-based language program is being authored, the program may be executed a number of times at different stages of the authoring process even after authoring is complete and the correctness of authored program is being evaluated. Results of execution at the various stages can be utilized by structure analysis system 100 to determine what classes, namespaces, and members have been created or augmented by the program.

The aforementioned systems, architectures, environments, and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull model. The components may also interact with one or more other components not specifically described herein for the sake of brevity, but known by those of skill in the art.

Furthermore, various portions of the disclosed systems above and methods below can include or employ artificial intelligence, machine learning, or knowledge or rule-based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example, and not limitation, the structure analysis system 100 can employ such mechanisms to infer and recognize patterns that indicate one or more of a class or namespace. In one non-limiting example, a pattern used by a library to construct a class can be learned and utilized to infer classes.

In view of the exemplary systems described above, methodologies that may be implemented in accordance with the disclosed subject matter will be better appreciated with reference to the flow charts of FIGS. 3-6. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

Figure 3:
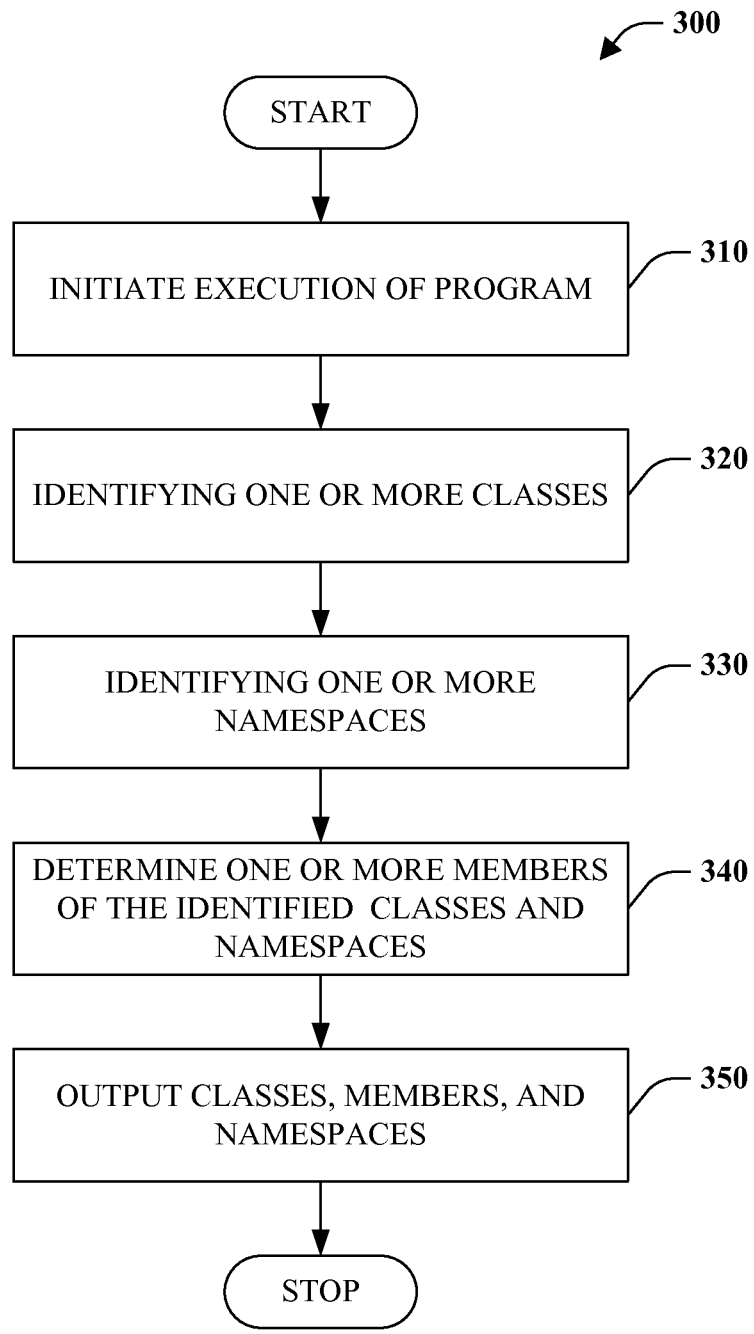
FIG. 3 is a flow chart diagram of a method of structure discovery.

Referring to FIG. 3, a structure discovery method 300 is illustrated. At reference numeral 310, execution of a program is at least initiated. Based on results from program execution, one or more classes are identified at numeral 320. For example, one or more patterns that indicate the presence of a class can be utilized to detect or infer a class based on recognition of the one or more patterns. At numeral 330, one or more namespaces are identified based on one or more patterns that indicate the existence of a namespace with respect to execution results. At reference numeral 340, one or more members of the identified one or more classes and namespaces can be determined. Class members can include data members such as constants and fields representing variables as well as methods, among other things. Namespace members include classes or other namespaces contained by a namespace. Identified classes, namespaces, and members are output at numeral 350. Together these identified class, namespaces and members can be termed a dynamic structure, which can be utilized, for instance, by a program editor or development environment to facilitate program navigation.

Figure 4:
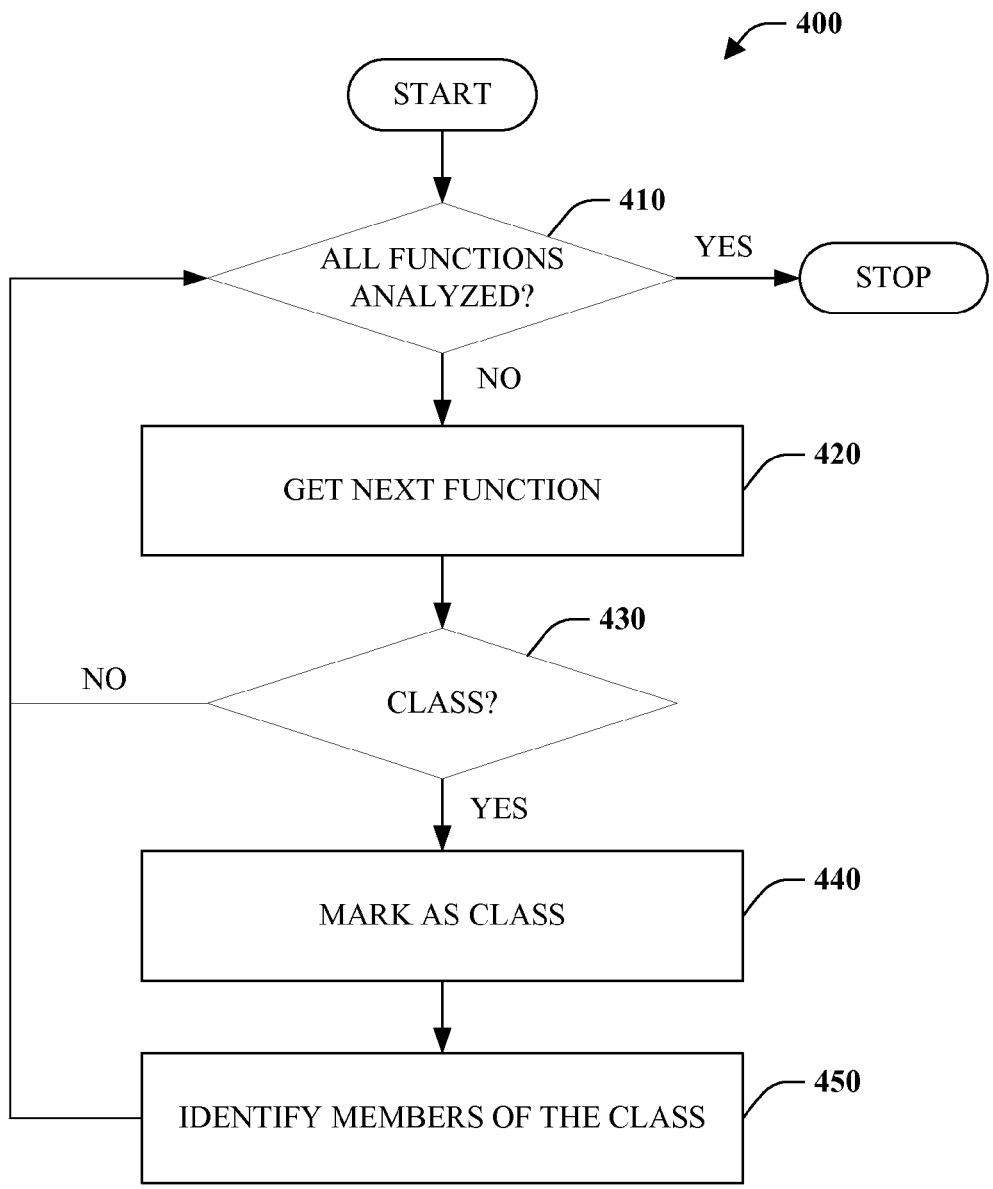
FIG. 4 is a flow chart diagram of method of identifying classes.

FIG. 4 depicts a method 400 of identifying classes. At reference numeral 410, a determination is made as to whether all functions, in a global space for instance, have been analyzed. If all functions have been analyzed ("YES"), the method terminates. If not all functions have been analyzed ("NO"), the method proceeds to get the next function for analysis at numeral 420. A determination is then made at reference numeral 430 as to whether the function is a class based upon one or more patterns that indicate the function is operating as a class. In accordance with one embodiment, the function can be deemed a class if the function includes a method, added by way of a prototype object, for instance. Methods specify behavior of an object. Accordingly, the presence of a method is indicative of a class. Here, a method is a function specified as a property value, for example on a prototype object. There are cases where a class does not include any prototype methods. Consequently, in accordance with another embodiment, a class can also be identified if a function includes one or more fields, for example set with the "this" keyword on a function. If at 430, a class is not identified ("NO"), the method loops back to determining whether all functions have been analyzed at reference numeral 410. Alternatively, if a class is identified at 430 ("YES"), the function is marked as a class at numeral 440. Stated differently, the fact that the function was identified as a class is recorded. At reference numeral 450, members of the identified class are detected. Class members include data such as constants, fields representing variables, and methods among other things that pertain to state and behavior of a class. Upon identifying members of a class, the method continues at 410, where a determination is made as to whether all functions have been analyzed.

Figure 5:
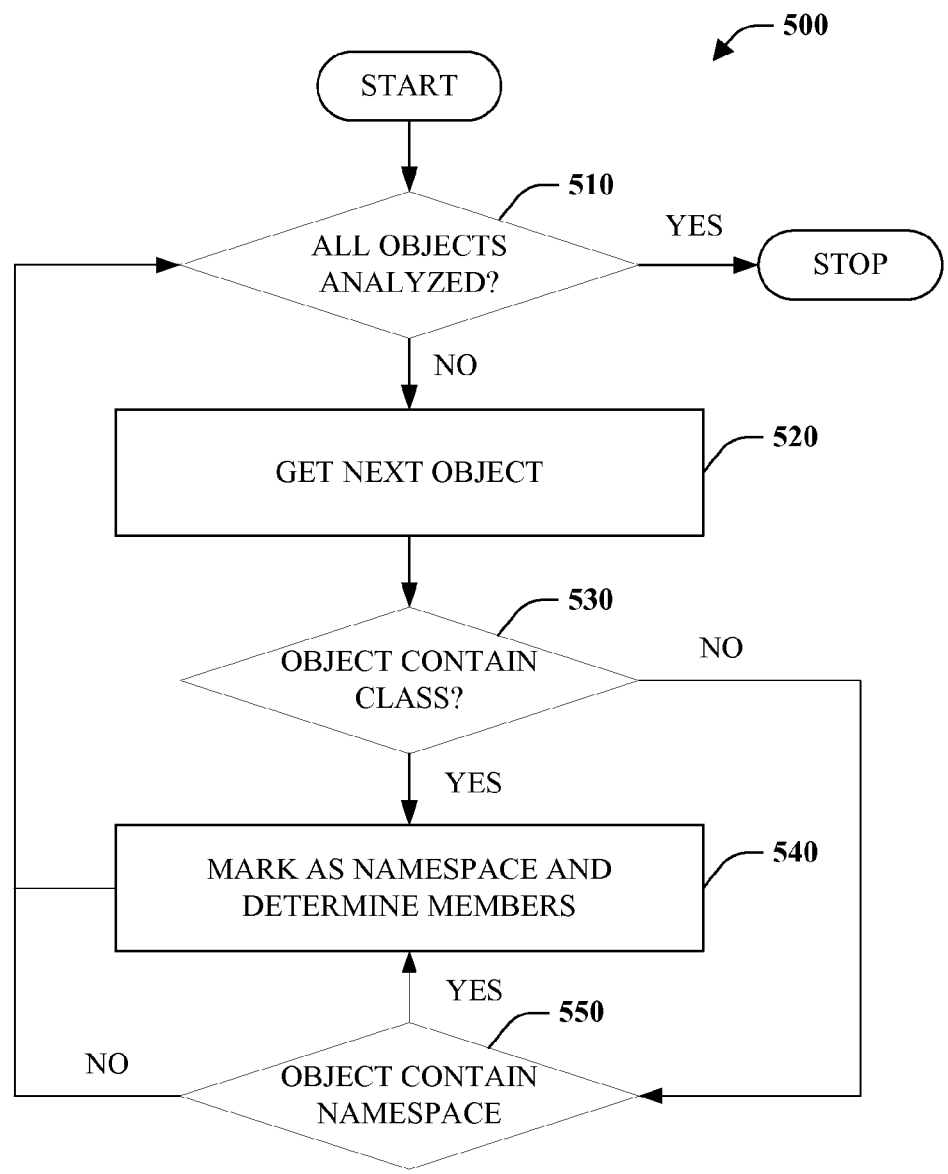
FIG. 5 is a flow chart diagram of a method of identifying namespaces.

In FIG. 5, a method of identifying namespaces 500 is illustrated. Although not limited thereto, in accordance with one embodiment, this method can be executed on objects not determined to be classes as functions are also objects. At numeral 510, a determination is made as to whether all objects have been analyzed, from a global space, for instance. If all objects have been analyzed ("YES"), the method terminates. However, if not all objects have been analyzed ("NO"), the method proceeds to get the next object at numeral 520. Next, a determination is made, at reference 530, as to whether the object contains a class. Namespaces are often containers for classes. Accordingly, detecting an object that includes at least one class can indicate the presence of a namespace. In one instance, method 400 of FIG. 4 can be invoked to detect the presence or absence of class. If the object includes a class at 530 ("YES"), the method continues at numeral 540, wherein the object is marked as a namespace. In other words, the fact that the object has been deemed a namespace is recorded. Furthermore, members of the namespace are determined and recorded as well, wherein members are one or more classes and other namespaces. If the object does not contain a class ("NO"), the method proceeds to reference numeral 550. At reference numeral 550, a determination is made as to whether the namespace contains a namespace or more specifically another namespace. Namespaces can include other namespaces. A namespace can be determined to include another namespace through recursion, for example. If at numeral 550 the object does not include a namespace ("NO"), the method continues at numeral 510, where a determination is made as to whether all objects have been analyzed. If, however, at numeral 550, the object includes a namespace ("YES"), the method proceeds to 540, where the object marked or otherwise recorded as a namespace and members are determined prior to continuing at numeral 510.

Figure 6:
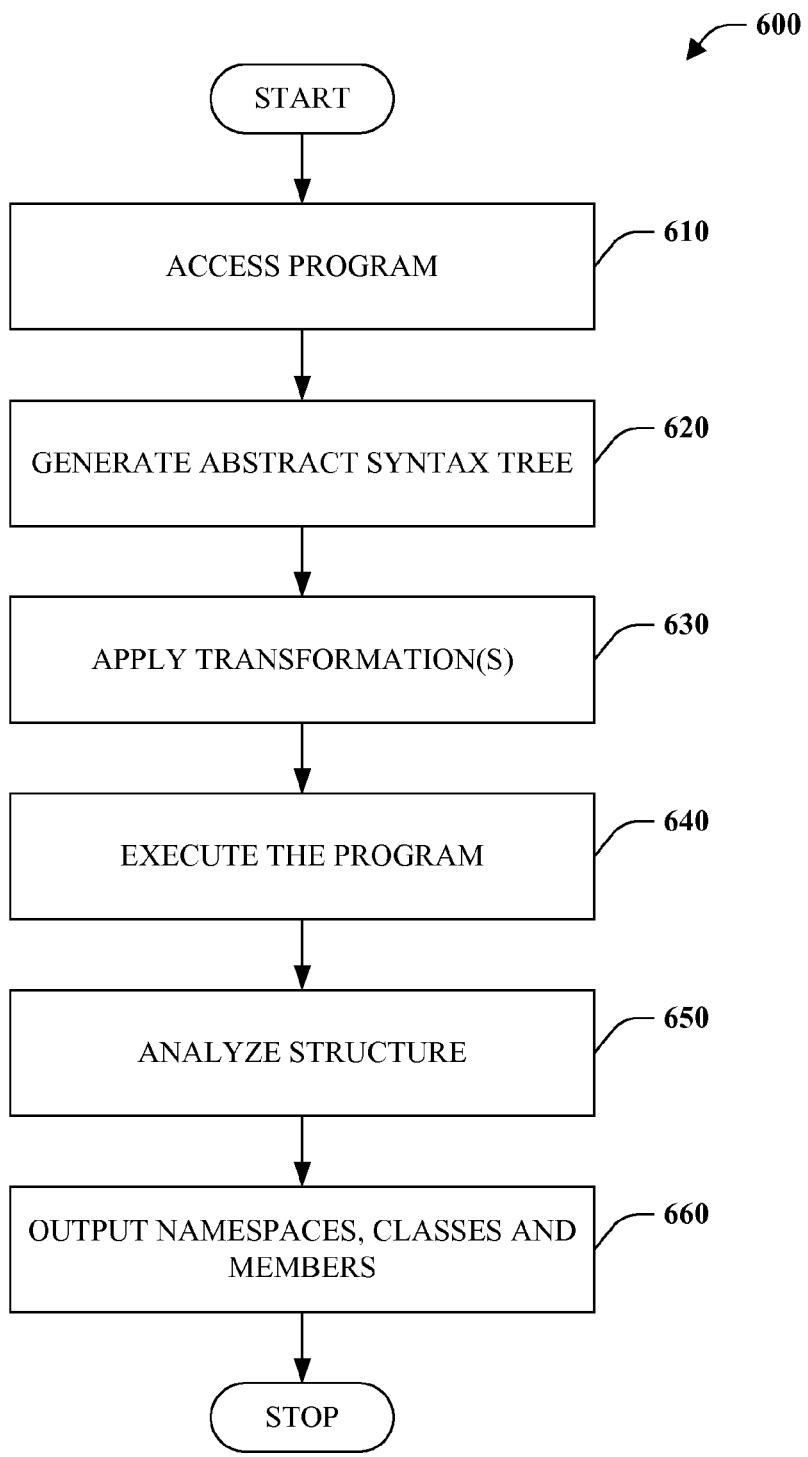
FIG. 6 is a flow chart diagram of a method of identifying structure implied by a program.

FIG. 6 is a flow chart diagram of a method 600 of identifying structure implied by a program. At reference numeral 610, a dynamic prototype-based programming language program is accessed. The point at which the program is accessed can be an arbitrary point in the authoring process, for example. At numeral 630, an abstract syntax tree is generated that represents at least a portion of the program or source code. One or more transformations can be applied to the abstract syntax tree, at numeral 630. A current version of a program that is being authored or edited may not be entirely syntactically correct. As a result, the abstract syntax tree can be modified in a manner that permits execution. Furthermore, directed execution transformations can be made with the purpose of changing the course of execution in a determined way. Examples include: 1) a forced conditional modification of the abstract syntax tree such that a condition is forced to be true; 2) loop guards that force halting of at least one loop should that loop take too long to execute; and 3) a forced exit of recursion in which the abstract syntax tree is modified to force an exit from recursion faster than would otherwise occur without modification. Of course, directed execution transformations may not be needed and thus disabled or not performed, or enabled and performed later if required. At numeral 640, the program is executed. The results of execution can be analyzed, at 650, to detect any structures implied by the program but not explicitly declared, such as but not limited to namespaces, classes, and members thereof. At reference numeral 660, detected structures, such as namespaces, classes, and members, can be output for subsequent use, for example by a program editor or development environment.

In one embodiment, namespaces, classes, and members thereof can be detected or inferred and captured by traversing a graph representing a global state in an orderly fashion. The Appendix included herein provides exemplary pseudo-code that can be implemented by the structure analysis system 100. Here, the input is a global object produced by executing the program. The dynamic structure is the result of calling the algorithm "dynamicAnalysis" on the global object. The dynamic structure forms a tree of namespaces, which is defined to be a global object that includes classes, or other namespaces and classes. The tree can be displayed in a user interface of a development environment to inform a user of which classes are present as well as allowing navigation to the classes, among other things.

The word "exemplary" or various forms thereof are used herein to mean serving as an example, instance, or illustration. Any aspect or design described herein as "exemplary" is not necessarily to be construed as preferred or advantageous over other aspects or designs. Furthermore, examples are provided solely for purposes of clarity and understanding and are not meant to limit or restrict the claimed subject matter or relevant portions of this disclosure in any manner. It is to be appreciated a myriad of additional or alternate examples of varying scope could have been presented, but have been omitted for purposes of brevity.

As used herein, the terms "component" and "system," as well as various forms thereof (e.g., components, systems, sub-systems . . . ) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The conjunction "or" as used in this description and appended claims is intended to mean an inclusive "or" rather than an exclusive "or," unless otherwise specified or clear from context. In other words, "'X' or 'Y'" is intended to mean any inclusive permutations of "X" and "Y." For example, if "'A' employs 'X,'" "'A employs 'Y,'" or "'A' employs both 'X' and 'Y,'" then "'A' employs 'X' or 'Y'" is satisfied under any of the foregoing instances.

As used herein, the term "inference" or "infer" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

Figure 7:
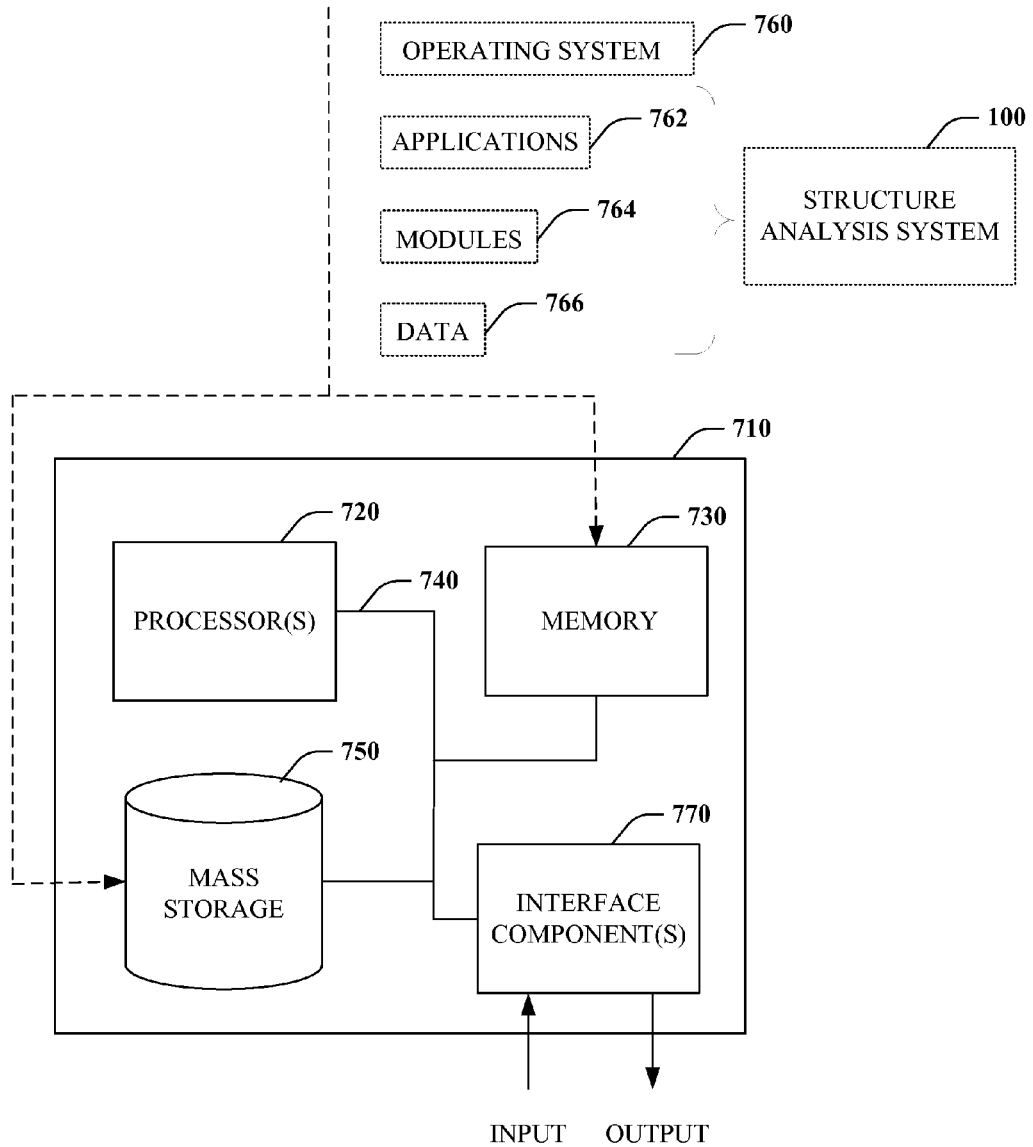
FIG. 7 is a schematic block diagram illustrating a suitable operating environment for aspects of the subject disclosure.

In order to provide a context for the claimed subject matter, FIG. 7 as well as the following discussion are intended to provide a brief, general description of a suitable environment in which various aspects of the subject matter can be implemented. The suitable environment, however, is only an example and is not intended to suggest any limitation as to scope of use or functionality.

While the above disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things that perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. Aspects can also be practiced in distributed computing environments where tasks are performed by remote processing devices that are linked through a communications network. However, some, if not all aspects of the claimed subject matter can be practiced on stand-alone computers. In a distributed computing environment, program modules may be located in one or both of local and remote memory storage devices.

With reference to FIG. 7, illustrated is an example general-purpose computer 710 or computing device (e.g., desktop, laptop, tablet, server, hand-held, programmable consumer or industrial electronics, set-top box, game system, compute node . . . ). The computer 710 includes one or more processor(s) 720, memory 730, system bus 740, mass storage 750, and one or more interface components 770. The system bus 740 communicatively couples at least the above system components. However, it is to be appreciated that in its simplest form the computer 710 can include one or more processors 720 coupled to memory 730 that execute various computer executable actions, instructions, and or components stored in memory 730.

The processor(s) 720 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 720 may also be implemented as a combination of computing devices, for example a combination of a DSP and a microprocessor, a plurality of microprocessors, multi-core processors, one or more microprocessors in conjunction with a DSP core, or any other such configuration.

The computer 710 can include or otherwise interact with a variety of computer-readable media to facilitate control of the computer 710 to implement one or more aspects of the claimed subject matter. The computer-readable media can be any available media that can be accessed by the computer 710 and includes volatile and nonvolatile media, and removable and non-removable media. Computer-readable media can comprise computer storage media and communication media.

Computer storage media includes volatile and nonvolatile, removable and non-removable media implemented in any method or technology for storage of information such as computer-readable instructions, data structures, program modules, or other data. Computer storage media includes memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid state devices (e.g., solid state drive (SSD), flash memory drive (e.g., card, stick, key drive . . . ) . . . ), or any other like mediums that can be used to store the desired information and accessed by the computer 710. Furthermore, computer storage media excludes modulated data signals.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 730 and mass storage 750 are examples of computer-readable storage media. Depending on the exact configuration and type of computing device, memory 730 may be volatile (e.g., RAM), non-volatile (e.g., ROM, flash memory . . . ) or some combination of the two. By way of example, the basic input/output system (BIOS), including basic routines to transfer information between elements within the computer 710, such as during start-up, can be stored in nonvolatile memory, while volatile memory can act as external cache memory to facilitate processing by the processor(s) 720, among other things.

Mass storage 750 includes removable/non-removable, volatile/non-volatile computer storage media for storage of large amounts of data relative to the memory 730. For example, mass storage 750 includes, but is not limited to, one or more devices such as a magnetic or optical disk drive, floppy disk drive, flash memory, solid-state drive, or memory stick.

Memory 730 and mass storage 750 can include, or have stored therein, operating system 760, one or more applications 762, one or more program modules 764, and data 766. The operating system 760 acts to control and allocate resources of the computer 710. Applications 762 include one or both of system and application software and can exploit management of resources by the operating system 760 through program modules 764 and data 766 stored in memory 730 and/or mass storage 750 to perform one or more actions. Accordingly, applications 762 can turn a general-purpose computer 710 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, the authentication and structure analysis system 100, or portions thereof, can be, or form part, of an application 762, and include one or more modules 764 and data 766 stored in memory and/or mass storage 750 whose functionality can be realized when executed by one or more processor(s) 720.

In accordance with one particular embodiment, the processor(s) 720 can correspond to a system on a chip (SOC) or like architecture including, or in other words integrating, both hardware and software on a single integrated circuit substrate. Here, the processor(s) 720 can include one or more processors as well as memory at least similar to processor(s) 720 and memory 730, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the structure analysis system 100 and/or associated functionality can be embedded within hardware in a SOC architecture.

The computer 710 also includes one or more interface components 770 that are communicatively coupled to the system bus 740 and facilitate interaction with the computer 710. By way of example, the interface component 770 can be a port (e.g., serial, parallel, PCMCIA, USB, FireWire . . . ) or an interface card (e.g., sound, video . . . ) or the like. In one example implementation, the interface component 770 can be embodied as a user input/output interface to enable a user to enter commands and information into the computer 710, for instance by way of one or more gestures or voice input, through one or more input devices (e.g., pointing device such as a mouse, trackball, stylus, touch pad, keyboard, microphone, joystick, game pad, satellite dish, scanner, camera, other computer . . . ). In another example implementation, the interface component 770 can be embodied as an output peripheral interface to supply output to displays (e.g., CRT, LCD, LED, plasma . . . ), speakers, printers, and/or other computers, among other things. Still further yet, the interface component 770 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

APPENDIX

```
define dynamicAnalysis(inputObject) : output as
    for each property p of the inputObject
        if p is a function
            let children be a list of nodes
            if p contains own properties, not including constructor
                for each own property p1 of p, that is not named
                constructor
                    if p1 is a function
                        add p1 to children, type: function
                    if p1 has a property descriptor with a get
                    property
                        add p1 to children, type: field, record
                        both the get and set property (if it
                        exists)
                    else
                        add p1 to children, type: field
            end if
            if p.prototype contains own properties, not including constructor
                for each own property p1 of p.prototype, that is not
                named constructor
                    if p1 is a function
                        add p1 to children, type: function
                        if p1 has a property descriptor with a get
                    property
                        add p1 to children, type: field, record
                        both the get and set property (if it
                        exists)
                    else
                        add p1 to children, type: field
                for each own property p1 of an instance of p
                    if p1 is a function
                        add p1 to children, type: function
                    if p1 has a property descriptor with a get
                    property
                        add p1 to children, type: field, record
```

APPENDIX-continued

```
                        both the get and set property (if it
                        exists)
                    else
                        add p1 to children, type: field
            if children is not empty
                add p to the output, type: class, children: children
            else
                add p to the output, type: function
        if p is an object
            let o be the result of calling dynamicAnalysis with p
            if o contains a class or a namespace
                add p to the output, type: namespace, children: o
    return output
end define dynamicAnalysis
```

What is claimed is:

1. A computer-implemented method, comprising:
initiating execution of a prototype-based program on a computer;
receiving a result of execution;
determining a structure implied by the program automatically based on recognition of a pattern in the result of execution; and
outputting the structure to a software development application that presents the structure on a display device.

2. The method of claim 1, determining the structure comprises detecting a class.

3. The method of claim 2, detecting the class comprises identifying a method on a prototype object.

4. The method of claim 2, detecting the class comprises identifying a field set on a function.

5. The method of claim 2, further comprises identifying members of the class.

6. The method of claim 1, determining the structure comprises detecting a namespace.

7. The method of claim 6, detecting the namespace comprises detecting a class.

8. The method of claim 6, detecting the namespace comprised detecting another namespace.

9. The method of claim 1 further comprising constraining the determining act to one or more portions of the program that changed since a previous execution.

10. A system, comprising:
a processor coupled to a memory, the processor configured to execute computer-executable instructions stored in the memory to perform operations comprising:
initiating execution of a prototype-based program;
receiving a result of execution;
detecting a class implied by the program based on recognition of a pattern in the result of execution indicative of a class; and
supplying the class to a software development application for presentation on a display device.

11. The system of claim 10, the operations further comprise detecting the class based on identification of a function that includes a method on a prototype object.

12. The system of claim 10, the operations further comprise identifying members of the class.

13. The system of claim 10, the operations further comprise detecting a namespace implied by the program based on another pattern in the result of execution.

14. The system of claim 13, the operations further comprise detecting the namespace based on identification of an object that includes the class.

15. The system of claim 13, the operations further comprise detecting the namespace based on identification of an object that includes another namespace.

16. A computer-readable storage medium having instructions stored thereon that enable at least one processor to perform a method upon execution of the instructions, the method comprising:
- initiating execution of a dynamic prototype-based program on a computer;
- receiving a result of execution;
- detecting a class implied by the program based on recognition of a pattern in the result of execution; and
- presenting the class on a display device in conjunction with a software development environment.

17. The computer-readable storage medium of claim 16, the method further comprises detecting the class by identifying a method on a prototype object.

18. The computer-readable storage medium of claim 16, the method further comprises detecting the class by identifying a field set on a function with a "this" keyword.

19. The computer-readable storage medium of claim 16, the method further comprises detecting a namespace based on recognition of another pattern in the result of execution.

20. The computer-readable storage medium of claim 19, the method further comprises detecting the namespace comprises identifying an object that includes the class.

* * * * *